(12) United States Patent
den Besten

(10) Patent No.: US 11,500,901 B2
(45) Date of Patent: Nov. 15, 2022

(54) APPARATUSES AND METHODS INVOLVING SYNCHRONIZATION USING DATA IN THE DATA/ADDRESS FIELD OF A COMMUNICATIONS PROTOCOL

(71) Applicant: NXP B.V., Eindhoven (NL)

(72) Inventor: Gerrit Willem den Besten, Eindhoven (NL)

(73) Assignee: NXP B.V., Eindhoven (NL)

( * ) Notice: Subject to any disclaimer, the term of this patent is extended or adjusted under 35 U.S.C. 154(b) by 449 days.

(21) Appl. No.: 16/456,206

(22) Filed: Jun. 28, 2019

(65) Prior Publication Data

US 2020/0409976 A1 Dec. 31, 2020

(51) Int. Cl.
*G06F 16/27* (2019.01)
*H04L 61/00* (2022.01)

(52) U.S. Cl.
CPC ............ *G06F 16/273* (2019.01); *H04L 61/00* (2013.01)

(58) Field of Classification Search
CPC ...... G06F 16/273; G06F 13/364; G06F 13/40; G06F 13/14; G06F 11/2082; G06F 16/178; H04B 7/269; H04L 29/0854
See application file for complete search history.

(56) References Cited

U.S. PATENT DOCUMENTS

| | | |
|---|---|---|
| 5,598,545 A | 1/1997 | Childers et al. |
| 5,603,013 A | 2/1997 | Ohara |
| 6,215,816 B1 | 4/2001 | Gillespie et al. |
| 7,511,530 B1 | 3/2009 | Cox et al. |
| 8,200,473 B1 * | 6/2012 | Dropps ................. H04L 69/324 703/21 |
| 8,631,483 B2 | 1/2014 | Soni et al. |
| 9,083,784 B2 | 7/2015 | Ku et al. |
| 9,455,713 B1 | 9/2016 | Kadkol |
| 10,042,768 B1 * | 8/2018 | Karnowski ........... H04L 67/568 |
| 10,140,227 B1 * | 11/2018 | Machulsky ......... G06F 13/4221 |
| 10,747,538 B2 | 8/2020 | Mouchel La Fosse et al. |
| 2002/0124007 A1 | 9/2002 | Zhao |
| 2008/0117952 A1 * | 5/2008 | Jordan ................... H04B 1/707 375/360 |

(Continued)

FOREIGN PATENT DOCUMENTS

JP 2015 035780 A 2/2015

OTHER PUBLICATIONS

Altera, "System Console User Guide", Nov. 2009, Intel. "https://www.intel.co.jp/content/dam/altera-www/global/ja_JP/pdfs/literature/ug/ug_system_console.pdf" (Year: 2009).*

(Continued)

*Primary Examiner* — Dhairya A Patel
*Assistant Examiner* — Eui H Kim

(57) ABSTRACT

An apparatus for a local area network includes a management communications bus, and at one of a plurality of logic nodes, logic circuitry. The management communications bus is for communication among the plurality of logic nodes, wherein respective node addresses for the plurality of logic nodes are conveyed using the management communications bus. The logic circuitry communicates information in a data/address field of the communications protocol with another of the plurality of logic nodes with reference to a subset of the predetermined set of patterned data bits in the data/address field to synchronize the transactions.

15 Claims, 3 Drawing Sheets

(56) References Cited

U.S. PATENT DOCUMENTS

| | | | |
|---|---|---|---|
| 2009/0313402 A1* | 12/2009 | Nara | G06F 13/4059 |
| | | | 710/52 |
| 2011/0096930 A1 | 4/2011 | Walmsley | |
| 2011/0142022 A1* | 6/2011 | Kubo | H04N 21/4122 |
| | | | 370/338 |
| 2012/0173484 A1* | 7/2012 | Perrin | G06F 16/178 |
| | | | 707/E17.005 |
| 2013/0002290 A1 | 1/2013 | Gondi et al. | |
| 2013/0106491 A1 | 5/2013 | Ryu | |
| 2014/0181845 A1 | 6/2014 | Jing et al. | |
| 2019/0104088 A1 | 4/2019 | Qin et al. | |
| 2019/0205244 A1 | 7/2019 | Smith | |
| 2019/0205248 A1* | 7/2019 | Hsieh | G06F 3/0679 |
| 2019/0361708 A1 | 11/2019 | Soe et al. | |
| 2020/0201637 A1 | 6/2020 | Mouchel La Fosse et al. | |
| 2020/0272474 A1 | 8/2020 | Gabor et al. | |
| 2020/0409706 A1 | 12/2020 | den Besten | |
| 2020/0409884 A1 | 12/2020 | den Besten | |
| 2020/0412368 A1 | 12/2020 | den Besten | |
| 2020/0412572 A1 | 12/2020 | den Besten | |

OTHER PUBLICATIONS

Non-Final Rejection for U.S. Appl. No. 16/456,111, 15 pgs, (dated Aug. 24, 2020).

Final Rejection for U.S. Appl. No. 16/456,111, 15 pgs., (dated Nov. 30, 2020).

Notice of Allowance for U.S. Appl. No. 16/457,287, 7 pgs, (dated Nov. 27, 2020).

Notice of Allowance for U.S. Appl. No. 16/456,236, 9 pgs, (dated Dec. 4, 2020).

Non-Final Rejection for U.S. Appl. No. 16/457,287, 6 pgs, (dated Nov. 13, 2020).

U.S. Appl. No. 16/456,467, filed Jun. 28, 2019, entitled: Apparatuses and Methods Involving Selective Disablement of Side Effects Caused by Accessing Register Sets. The Examiner is referred to the copending patent prosecution of the common Applicant (no attachment).

U.S. Appl. No. 16/456,111, filed Jun. 28, 2019, entitled: Apparatuses and Methods Involving First Type of Transaction Registers Mapped to Second Type of Transaction Addresses. The Examiner is referred to the copending patent prosecution of the common Applicant (no attachment).

U.S. Appl. No. 16/457,287, filed Jun. 28, 2019, entitled Apparatuses and Methods Involving Disabling Address Pointers. The Examiner is referred to the copending patent prosecution of the common Applicant (no attachment).

U.S. Appl. No. 16/456,236, filed Jun. 28, 2019, entitled Apparatuses and Methods Involving a Segmented Source-Series Terminated Line Driver. The Examiner is referred to the copending patent prosecution of the common Applicant (no attachment).

Notice of Allowance for U.S. Appl. No. 16/456,467, 9 pgs, (dated Jan. 22, 2021).

IEEE Standard for Ethernet, IEEE 802.3-2018, Clauses 22 and 45 (abstract only).

Open Alliance, TC10 Wake-up and Sleep Specification for Automotive Ethernet.

Yue Lu, Kwangmo Jung, Yasuo Hidaka, Elad Alon, "Design and Analysis of Energy-Efficient Reconfigurable Pre-Emphasis Voltage-Mode Transmitters," in IEEE Journal of Solid-State Circuits, vol. 48, No. 8, Aug. 2013 (abstract only).

Notice of Allowance for U.S. Appl. No. 16/457,287, 6 pgs, (dated Mar. 3, 2021).

Notice of Allowance for U.S. Appl. No. 16/456,111, 8 pgs, (dated Feb. 19, 2021).

* cited by examiner

APPARATUSES AND METHODS INVOLVING SYNCHRONIZATION USING DATA IN THE DATA/ADDRESS FIELD OF A COMMUNICATIONS PROTOCOL

OVERVIEW

Aspects of various embodiments are directed to apparatuses that synchronize logic nodes using data in a data/address field of a communications protocol.

Local area networks (LANs) are a means by which many network modules or work stations are interconnected so as to share resources such as data and applications, providing considerable cost savings over, for example, a mainframe computer with multiple attached terminals, and providing other benefits as well. An example LAN arrangement is the so-called "Ethernet" LAN, which is defined by an industry compliant standard, namely, the Institute of Electrical and Electronic Engineer (IEEE) 802.3 standard. This standard allows network devices of various manufacturers, such as network interface cards (NICs), hubs, bridges, routers, and switches, to communicate packetized data with each other in the LAN. The IEEE 802.3 standard is defined in terms of the Open Systems Interconnection (OSI) reference model. This model defines a data communication system in terms of layers. Among the layers included in the OSI model are: (1) the physical layer (PHY), which specifies the electrical and coding characteristics of the transmission medium; (2) the medium access control (MAC) layer, which controls flow of data through the network; and (3) the network layer, which sets up connections between sources and destinations for data communicated in the network. Other layers include the transport layer, which is a protocol stack for transporting the data, and the application layer, such as a word-processor or spread sheet application.

These and other matters have presented challenges to efficiencies of logic node implementations, for a variety of applications.

SUMMARY

Various example embodiments are directed to issues such as those addressed above and/or others which may become apparent from the following disclosure concerning synchronize logic nodes using data in a data/address field of a communications protocol.

In certain example embodiments, aspects of the present disclosure involve synchronization, in lieu of the optional preamble field, using the subset of the predetermined set of patterned data bits in the data/address field.

In a more specific example embodiment, an apparatus is for use in a local area network (LAN) characterized by a plurality of network modules configured to convey data over a physical communication channel and with at least one of the network modules including a management communications bus for communication among a plurality of logic nodes via a communications protocol and the communications protocol having an optional preamble field with a predetermined set of patterned data bits to synchronize communications between logic nodes among the plurality of logic nodes. The apparatus includes the management communications bus and logic circuitry at one of the plurality of nodes. The management communications bus is for communication among the plurality of logic nodes. The logic circuitry communicates information in a data/address field of the communications protocol with another of the plurality of logic nodes with reference to a subset of the predetermined set of patterned data bits in the data/address field to synchronize the transactions. More specifically, the subset of the predetermined set of patterned data bits in the data/address field is used to synchronize to the transactions in lieu of the optional preamble field. Additionally, the subset of the predetermined set of patterned data bits in the data/address field may include a uniquely recognizable subset of the predetermined set of patterned bits, such as a uniquely recognizable consecutive set of values which is provided as part of load data and in lieu of the optional preamble (e.g., without).

In some embodiments, one of the plurality of logic nodes is a master logic node that communicates the information to another of the plurality of logic nodes and wherein the optional preamble field and the data/address field are in compliance with the communications protocol. For example, said one of the plurality of logic nodes is a master logic node and the other of the plurality of logic nodes is a slave logic node, and wherein the master logic node communicates a communications transaction to the slave logic node in response to an indication that the slave logic node is not synchronized. The communications transaction includes a write transaction with the data/address field having the subset of the predetermined set of patterned data bits, and which may be uniquely recognizable. The use of the optional preamble field may be disabled, for example, by the master logic node, as further described herein.

In other embodiments, said one of the plurality of logic nodes is a slave logic node that receives the communicated information from the other logic node that includes a master logic node, and in response, synchronizes to the transactions. The communications protocol is compliant with an industry standard that defines an Ethernet-based LAN technology. The slave logic node may ignore communications transactions when unsynchronized, receives the communicated information from a master logic node among the plurality of logic nodes, and in response, synchronizes to the transactions. Additionally, the slave logic node receives the communicated information from a master logic node, and in response, synchronizes to the transactions.

The communicated information may include a write transaction, with the write transaction including the data/address field having the subset of the predetermined set of patterned data bits. For example, the write transaction may be to a physical address that is not in use, to a read-only register address, to a port address that is not in use, to a management data input/output-managed device (MMD) number that does not exist for an indicated port address, to a MMD number associated with an address pointer to an unused register address, or to a MMD number associated with a register address that is reserved.

Other embodiments are directed to methods of using the above-described apparatus. An example method includes communicating over the management communications bus among the plurality of logic nodes, and at one of the plurality of logic nodes and using circuitry, communicating information in a data/address field of the communications protocol with another of the plurality of logic nodes with reference to a subset of the predetermined set of patterned data bits in the data/address field to synchronize to transactions. Communicating the information includes providing the subset of the predetermined set of patterned data bits in the data/address field and communicating the information as a communications transaction to the other of the plurality of logic nodes to synchronize in lieu of the optional preamble field. As such, the data is communicated without a preamble field. The method may further include processing, at the other of the plurality of logic nodes, the communicated information, and in response to the subset of the predetermined set of patterned data bits, synchronizing in lieu of the preamble field.

The plurality of logic nodes at least includes a master logic node and a slave logic node and said logic node is the slave logic node or the master logic node, in various embodiments. For example, the method further includes determining that the other of the plurality of logic nodes is not synchronized and communicating the information to the other logic node in response. In such embodiments, said logic node is the master logic node, determining that the other of the plurality of logic nodes is not synchronized includes identifying the other logic node is unresponsive to a previously provided communications transaction. The method may further include disabling the preamble fields for transactions.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
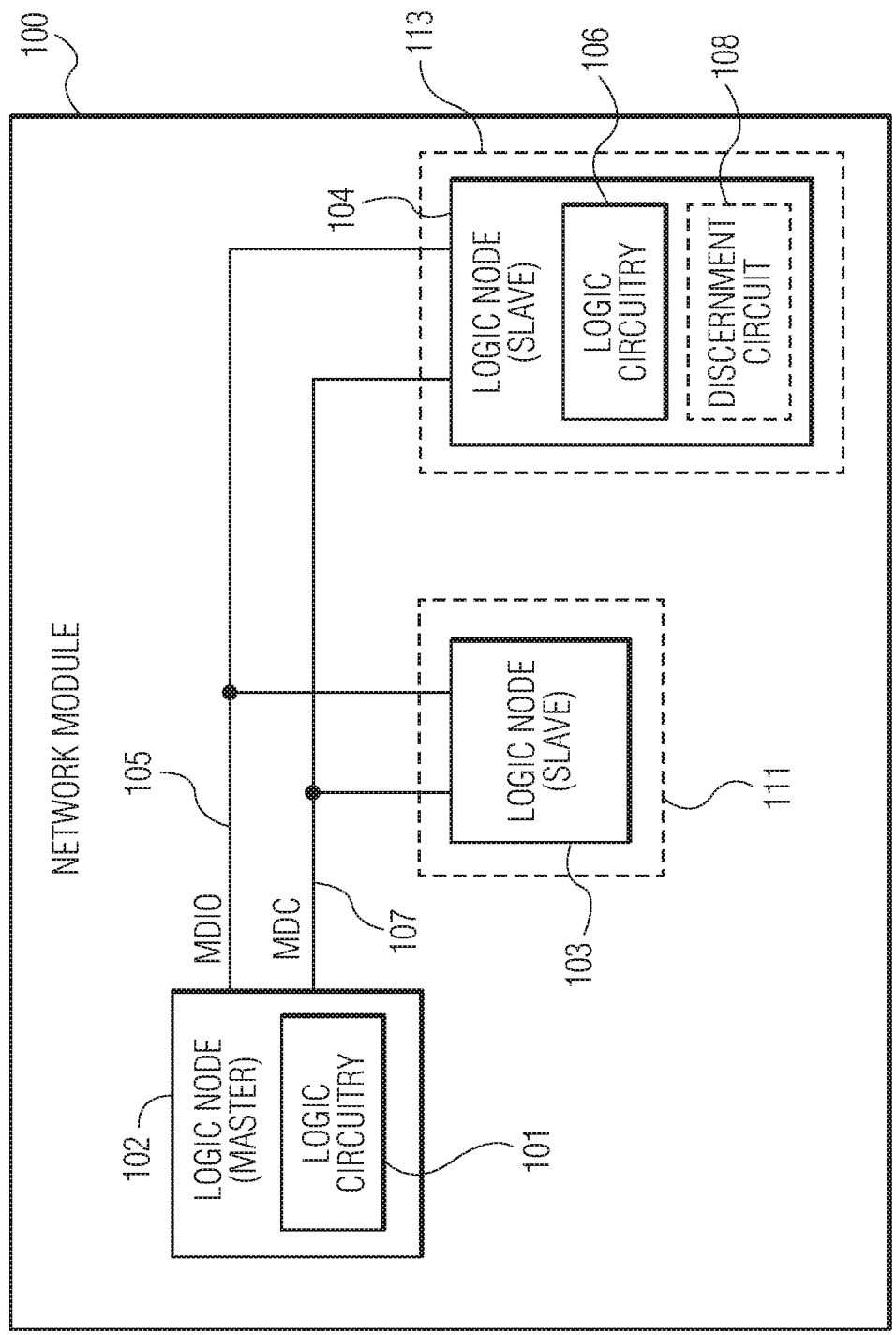
FIG. 1 illustrates an example apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving synchronizing logic nodes using data in a data/address field of a communications protocol. In certain implementations, aspects of the present disclosure have been shown to be beneficial when used in the context of synchronization, in lieu of an optional preamble field, using the subset of the predetermined set of patterned data bits in the data/address field. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various local area networks (LANs) allow network devices of manufacturers, such as network interface cards (NICs), hubs, bridges, routers, and switches, to communicate packetized data with each other in the LAN. Systems, sub-systems, or functions in a system of network modules of the LAN may be managed via registers using a register interface, to access these registers (e.g., via SMI as further described herein). This applies, for example, to Ethernet physical devices or sub-systems, sometimes referred to as "PHYs" or Ethernet PHY sub-systems that are managed via a serial management interface (SMI). The SMI can support different types of transactions that include indirect addressing, direct addressing, or both. The communications include access to memory, e.g., registers, in the PHYs. The PHYs may use a register map for configuration, control, and status readout of associated registers. The PHYs are located on or include logic nodes. In many network modules, such as network modules of the LANs, there are two types of logic nodes, a master logic node and slave logic nodes each coupled to a management communications bus. The master logic node manages access to the management communications bus and initiates the communications with the slave logic nodes over the management communications bus using the communications protocol. The slave logic nodes have an internal bus to couple internal PHYs and/or subsystems and communicate over the management communications bus, with each slave logic node including one or more PHYs or subsystems. Each PHY has a corresponding port address such that each PHY is separately addressable. Embodiments in accordance with the present disclosure include methods and apparatuses involving synchronization of the slave logic nodes to communications transactions using data in the data/address field of the data frame in compliance with the communications protocol. Synchronization may occur or be useful when a slave logic node starts observing the management communication bus at an arbitrary time while there are transactions ongoing, for example due to a reset, wake-up from sleep, power-up, or a power-cycle.

Ethernet has defined a SMI for register access and PHY management. This may be specified in Institute of Electrical and Electronic Engineer (IEEE) 802.3 Clause 22 for early Ethernet PHY generations using direct addressing to up to thirty-two registers (e.g., one of the up to thirty-two registers may be used for indirect access, as described below and does not involve a directly accessible register) and extended in Clause 45 for Ethernet PHY generations using indirect addressing to multiple device per PHY and a 64k (=2^16) address space per devices, referred to as management data input/output-managed devices (MMDs). Those registers are 16 bits wide. The management communications bus may include a two-wire interface that includes a management data input/output (MDIO) bus wire and a management data clock (MDC) clock wire. Any of the devices connected to the MDIO bus wire may drive the bus, but only one can at a time. The master logic node drives the MDC which is distributed to all slave logic nodes. The MDIO frames are generally thirty-two MDC clock cycles long and have at least one idle, e.g., Z, cycle between frames. There can also be a Z state inside read transactions to allow bus turn-around without driver conflict. If there are no transactions, all drivers are tri-stated and the default MDIO bus state is high due to a resistive pull-up. Generally, a preamble is used on the management frames, however, the preamble field may be optional. The optional preamble consists of thirty-two MDC clock cycles with MDIO bus driven high ('1') before every start-of-frame, and which may be used to synchronize the slave logic nodes. A preamble field with a predetermined set of patterned data bits (e.g., thirty-two consecutive ones) is used to synchronize communications. Embodiments in accordance with the present disclosure include apparatuses that allow for synchronization without the optional preamble. The PHY register map, as further described herein, includes a read-only bit to indicate if it can accept management frames that are not preceded by a preamble. When all slave logic nodes on the bus can accept this, the master logic node may suppress or disable sending preamble and frames are initiated by a start-of-frame (ST) only and synchronizes using the data in the data/address field.

Slave logic nodes, in accordance with the present disclosure, ignore communicated transactions involving indirect addressing on the management communications bus in response to a reset, power up, or wake-up until a synchronization occurs. A particular slave logic node may be reset or powered up, or wakes-up from a sleep. If the particular slave logic node is not synchronized to the management frame, it may start interpreting the signal on the management communications bus at an arbitrary moment in time, which may be in the middle of an ongoing transaction. As an example, when a preamble is suppressed, and the SMI-slave synchronize on the ST field, and looks for the first zero on the bus and interprets this as a start of frame. By the slave logic node ignoring the communications transaction, the master logic node may be notified of the non-responsiveness of the slave logic node and which may indicate to synchronize.

The master logic node synchronizes by using data in the data/address field of the management frame. The data may include a subset of the predetermined set of patterned data that is used by other apparatuses, in the preamble, to synchronize, such as sixteen ones in the data/address field, and which is uniquely recognizable. Any time a logic node observes the subset of the predetermined set of patterned data bits in the data/address field, the logic node synchronizes to the transactions. This may prevent or mitigate the likelihood of observing syntactically valid frames with incorrect content, that may result in corrupted register values in the slave logic node, bus driver conflicts, and receiving incorrect results by the master logic node. While in some embodiments, payload data may include the subset of the predetermined set of patterned data, additional synchronizations, such as when the master logic node may not intend, may not impact the device. Further, the use of the data in the data/address field to synchronize slave logic nodes may reduce MDIO bus load compared to using the preamble to synchronize.

In various embodiments, the communications protocol is in accordance with IEEE 802.3. The IEEE 802.3 specification defines two PHY register maps, one for each of Clause 22 and Clause 45. There is a register map defined in IEEE 802.3 Clause 22 for generations of Ethernet PHYs which contains the registers that are directly accessed via the management communications bus (e.g., management data input/output (MDIO)). There is another register map defined in IEEE 802.3 Clause 45 that is used for generations of Ethernet PHYs. This register map provides a larger register space than for Clause 22, which is sub-divided over multiple MDIO-managed devices (MMDs). Accessing the registers of these different Clauses requires different MDIO commands. For example, an MDIO access method for Clause 45 registers involves indirect addressing, which uses different MDIO commands than the access of Clause 22 registers which involves direct addressing. Both register maps include an IEEE-defined register address space and a vendor-specific register address space. Registers in the vendor-specific space can be assigned by the device manufacturer.

Although the above describes an application for Ethernet SMI, embodiments are not so limited and may be applied to other interfaces and communications protocols.

Turning now to the figures, FIG. 1 illustrates an example apparatus, in accordance with the present disclosure. The apparatus is for use in a LAN that is characterized by a plurality of network modules that convey data over a physical communication channel, such as media-independent interface connections connecting the plurality network modules. Network modules consisting of multiple devices may include a management communications bus for communicating among a plurality of logic nodes within the network module via a communications protocol. One or more of the network modules of the LAN may not have a management communication bus, such as single device network modules. The communications protocol is compliant with an industry standard that defines an Ethernet-based LAN technology, such as IEEE 802.3. The apparatus, as shown by FIG. 1, may include or be associated with one of the plurality of network modules and/or one of the logic nodes 102, 103, 104.

As shown, the network module 100 includes a plurality of logic nodes 102, 103, 104 and a management communications bus 105, 107 for communication among the plurality of logic nodes 102, 103, 104 in response to communications set over the management communications bus 105, 107. Respective node addresses for the plurality of logic nodes 102, 103, 104 are conveyed using the communications over the management communications bus 105, 107 (e.g., which as may be appreciated may include addresses for the slave logic nodes and not the master logic nodes) The management communications bus 105, 107 includes two lines, a clock line and data line, respectively referred to as the MDC 107 and the MDIO 105. MDC 107 provides a full-rate clock signal from the master logic node 102 to the slave logic nodes 103, 104 to drive and slice bits on MDIO 105 during frames. The clock signal may stop during idle. MDIO 105 is a bi-directional bus with a tri-state driver in each logic node 102, 103, 104 and restive pull-up on the bus. The management communications bus 105, 107 allows for addressing the (slave) logic nodes 103, 104 by conveying addresses (e.g., port and register addresses) over the management communications bus 105, 107 using direct or indirect addressing, as further described herein. Various apparatus embodiments are directed to one of the logic nodes 102, 103, 104 (such as the master logic node 102 or one of the slave logic nodes 103, 104), more than one of the logic nodes, and/or the network module 100.

In a number of embodiments, two different types of logic nodes are connected to the management communications bus 105, 107, namely, slave logic nodes 103, 104 and a master logic node 102. The master logic node 102 generates the clock and initiates communications with the slave logic nodes 103, 104. The slave logic nodes 103, 104 receive the clock and respond when addressed by the master logic node 102. Although a single master logic node 102 and two slave logic nodes 103, 104 are illustrated, embodiments are not so limited and can include additional or fewer logic nodes. The master logic node 102 is typically a micro-controller and is called station management entity (STA) in the IEEE specification. The slave logic nodes 103, 104 are typically Ethernet PHYs, however SMI may also be used to manage other types of devices as it is a register interface. In some network modules, such as with SMI, there is one master logic node and one more slave logic nodes. However, embodiments are not so limited and other types of modules may include more than one master logic node and/or may not include master/slaves.

In a number of embodiments, the logic nodes may be devices or form part of a device 111, 113, such as a network-module device. A network-module device, as used herein, refers to or includes a device having MDIO connections to internal logic nodes (or a node) of the plurality of logic nodes of the network module. Each device 111, 113 may include one logic node or multiple logic nodes, with each logic node having one PHY, multiple PHYs and/or multiple subsystems. Although the slave logic nodes 103, 104 are illustrated on separate devices 111, 113 and the master logic node 102 is not illustrated on a device, embodiments are not so limited. For example, the master logic node 102 may be on the same device 111, 113 as the one slave logic nodes 103, 104. Further, the slave logic nodes 103, 104 may be on the same device, and not separate device.

One or more of the plurality of logic nodes 102, 103, 104 may include a PHY or multiple PHYs that connect to the data link layer, such as the medium access control (MAC) layer via a media independent interface (MII). A PHY may be a chip, which may include one or multiple PHYs. Larger chips may contain one or more PHY subsystems, each including one or more PHYs. A PHY includes or refers to an individual chip or circuit, as a part of a circuit assembly, or a subsystem (e.g., circuit) of a device (e.g., an SMI slave device having multiple PHYs, such as an IC). The PHYs are configured to implement physical layer functions. Each PHY has its own port address, and, in some embodiments, multiple PHYs are integrated into one device and/or a slave logic node (and/or, optionally, with multiple logic nodes on a device) having one shared SMI interface. Each PHY includes a physical coding sublayer (PCS), a physical media attachment layer (PMA) and/or a physical media dependent layer (PMD), as well as a media-dependent interface (MDI) that connects to the media (e.g., cable). The PMD is an interface between the PMA and the transmission medium through the MDI. The PMD receives serialized bits from the PMA and converts to the appropriate signals for the transmission medium (such as optical signals for a fiber optic line or electrical signals for a copper line), and vice versa. When transmitted to the PMA, the PCS encodes the data to be transmitted into the appropriate code group. When receiving the code groups from the PMA, the PCS decodes the code groups into the data format that can be understood and processed by upper layers. The MII carries signals between the physical layer and the data link layer, such as to a MAC controller. The MII may include a reduced media-independent interface (RMII), gigabit media independent interface (GMII), a reduced gigabit media independent interface (RGMII), serial gigabit media-independent interface (SGMII), quad serial gigabit media-independent interface (QSGMII), and 10-gigabit media-independent interface (XGMII), among others.

The logic nodes 102, 103, 104 (e.g., the PHY or PHYs internal to the logic nodes) may include registers associated with different types of transactions. The different types of transactions are both compliant with the same communications protocol, and include different types of addressing and corresponding commands. For example, the first type of transaction includes direct addressing and the second type of transaction includes indirect addressing. For direct addressing, the addresses (e.g., the port address and register address) are included in the command with the instruction for the transaction. For indirect addressing, the address (e.g., the register address) is held in an intermediate location that is looked up for the instruction for the transaction. In specific embodiments, the direct addressing includes one command that has the address and the data parts. For indirect addressing, two commands are used, with the first including the address part (e.g., register address) and the second including the data part. The first type (e.g., Clause 22) of transaction may provide access to up to N registers in each of the M plurality of logic nodes, N and M being positive integers, and the second type of transaction (e.g., Clause 45) may provide access to a plurality of registers in each of the one of the M plurality of logic nodes that is greater than N. In specific embodiments, the logic nodes support both the first and second type of transactions, although embodiments are not so limited.

One or more of the slave logic nodes 103, 104 may become unsynchronized to the management frame communicated on the management communications bus 105, 107 due to a reset of the respective logic node. The communications protocol may have an optional preamble field with a predetermined set of patterned data bits to synchronize communications between logic nodes among the plurality of logic nodes. A reset may occur due to local reset events, a power failure, or due to power-cycling of the logic supply during a sleep-wake up cycle. The reset may occur at different times for different of the slave logic nodes 103, 104. For example, automotive Ethernet PHYs including TC10 wake-sleep functionality may individually go into sleep and wake-up at arbitrary points in time, while MDIO transactions may still be needed to other slave logic nodes on the MDIO bus 105.

Another of the logic nodes, such as the master logic node 102, may cause synchronization by using data in the data/address field of the management frame. For example, the logic node 102 includes logic circuitry 101 that communicates (e.g., sends) information in a data/address field of the communications transaction (e.g., the management frame) with another of the plurality of logic nodes 103, 104 with reference to a subset of the predetermined set of patterned data bits in the data/address field to synchronize to the transactions. As specific example, an optional preamble in compliance with the communications protocol may include thirty-two consecutive ones as causing or triggering synchronization, and the subset of the predetermined set of patterned data bits in the data/address field includes a series of sixteen or more ones, such as sixteen consecutive ones. The subset of the predetermined set of patterned data bits may occur due to a preamble, idle state or cycle, or sixteen or more ones in the data/address field of the communications transaction, followed by a zero (which indicates the start-of-frame field). As may be appreciated, the data/address field may (always) be followed by an idle cycle or state, where the management communication bus stays high. However, embodiments are not so limited and may include other patterns, such as a unique sequence for master/slave interfaces other than SMI. The subset of the predetermined set of patterned data bits in the data/address field is used to synchronize to the transactions in lieu of the optional preamble field. The optional preamble field and the data/address field are in accordance with, e.g., compliant with, the communications protocol. As previously described, when all slave logic nodes 103, 104 on the bus can accept communication (e.g., data) transactions without preambles, the master logic node 102 may suppress or otherwise disable sending preamble and frames are initiated by a start-of-frame (ST) only.

In the specific embodiment, the logic node 102 is a master logic node that communicates the information to another of the plurality of logic nodes 103, 104 (e.g., the slaves). The master logic node 102 communicates a communications transaction in response to an indication that the slave logic node 104 is not synchronized, although embodiments are not so limited. The communications transaction includes a write transaction with the data/address field having the subset of the predetermined set of patterned data bits. The write transaction can be addressed to a variety of different ways to mitigate further functional impact on the slaves, other than synchronization. As an example, the write transaction is to a physical address that is not in use, such as to a non-existing PHY address for a Clause 22 transaction. In other embodiments, the write transaction is to a port address that is not in use, such as a non-existing port address for a Clause 45 transaction. As another example, the write transaction is to an MMD number that does not exist for an indicated port address (e.g., DEVAD/MMD does exist for selected port), such as to a non-existing MMD for a Clause 45 transaction. In various embodiments, the write transaction to an address of a read-only register (e.g., register that can only be read and may ignore write transactions), such as to a read-only register address for a Clause 22 transaction or a Clause 45 transaction. In other embodiments and/or in addition, the write transaction is to a MMD number associated with an address pointer to an unused register address or a register address that is reserved (and address pointer does change), such as a reserved/unused register or a register that is allocated for synchronization purposes for a Clause 45 transaction.

In various embodiments, the subset of the predetermined set of patterned data bits in the data/address field includes a consecutive set of values which is provided as part of load data and which is uniquely recognizable. In such embodiments, the slave logic node 103, 104 observes the communicated information from a master logic node 102, and in response, synchronizes to the transactions (e.g., can synch in response to normal data being sent that happens to include sixteen ones in a row). The slave logic node 103, 104, may or may not already be synchronized. The slave logic node 103, 104 may synchronize in response to the subset of the predetermined set of patterned data bits in the data/address field (and/or other fields) independent of whether the transaction is addressed to the respective slave logic node 103, 104 (e.g., the communication may be to another device, node, or non-exiting port address or MMD). For example, in response to observing the subset of the predetermined set of patterned data bits, such as sixteen ones in the data/address field (followed by a zero), each of the slave logic nodes 103, 104 synchronizes to the transaction regardless of whether the nodes are synchronized or unsynchronized.

Embodiments in accordance with the present disclosure are not limited to master logic node embodiments and may be directed to a slave logic node and which may include discernment logic circuit 108 and logic circuitry 106. For example, a slave logic node 104 receives the communicated information from the other logic node (e.g., the master logic node 102), and in response, synchronizes to the transactions. The slave logic nodes 104 (or multiple) synchronize in response to observing the subset of the predetermined set of patterned data, independent of whether the transaction is addressed to the slave logic node 104. Prior to the synchronization and in response to a reset, slave logic node 104 ignores communicated data transactions, also referred to herein as "communications transactions", when unsynchronized, receives the communicated information from the master logic node among the plurality of logic nodes, and in response, synchronizes to the transactions.

Figure 2:
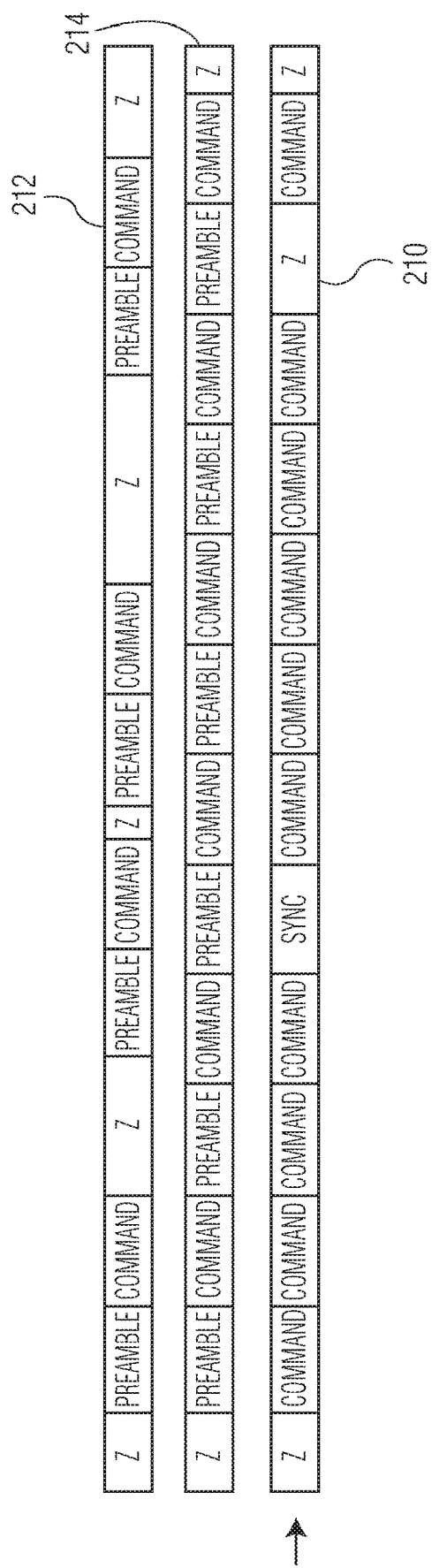
FIG. 2 illustrates example commands according to the communications protocol for an apparatus, in accordance with the present disclosure.

FIG. 2 illustrates example commands according to the communications protocol for an apparatus, in accordance with the present disclosure. The communications protocol, in a specific example is associated with Clause 45 data frames and/or with a communications protocol associated with Clause 22 data frames.

Clause 22 transactions involve direct addressing. The frame fields in the data frames include:
PRE: a preamble frame field which is "1" for thirty-two clock cycles
ST: start-of-frame, which is fixed to "01"
OP: operation code which identifies read or write operation (with 10 include read and 01 including write)
PHYAD: a five bit (PHY) port address
REGAD: a five bit register address
TA: turn-around (hand over for read and filler for writes)
DATA: sixteen bit register value (e.g., data).

By contrast, Clause 45 transactions involve indirect addressing. There are four example data frames, the first for an address part of a read or write transaction, the second for a read operation, the third for a write operation, and the fourth for post-read increment addressing in accordance with Clause 45 of IEEE 802.3. The frame fields in the data frame include:
PRE: a preamble frame field which is "1" for thirty-two clock cycles
ST: start-of-frame, which is fixed to "00"
OP: operation code which identifies address, read or write operation (with 00 being write an address, 10 including read, 01 including write, and 11 including read and increment address)
PRTAD: a five bit (PHY) port address
DEVAD: a five bit MDIO-manage device (MMD) number
DATA: sixteen bit address or register value (e.g., data)
The ST identifies whether the transaction is Clause 22 or Clause 45. For a Clause 45 transaction, the address is not included in the data/write commands. The address can be selected per MMD and is set by a separate (address) command. The data read/write operations are directed to this address. The address space for Clause 45 is sixteen bit wide (e.g., 65536 registers).

Valid management frames may have a zero at the first and sixteenth bit of the frame. For this reason, there cannot be more than sixteen consecutive ones on the management communications bus within a management frame. These sixteen consecutive ones (0xFFFF) within a frame can occur when the DATA or ADDRESS field, herein generally referred to as the "data/address field." The sixteen consecutive ones (followed by a zero) triggers slave logic node synchronization, because the sequence implicitly marks the end of the frame. The bus state remains high after that until the next start of frame (ST) field. A write transaction with the data/address field containing sixteen ones can be denoted as a synchronization (SYNC) frame. SYNC frames can be Clause 22 frames, Clause 45 data frames, or Clause 45 address frames.

More specifically, FIG. 2 illustrates example management frame cycles on the MDIO bus. Three different management frame cycles 212, 214, 210 are illustrated by FIG. 2. The first two management frame cycles 212, 214 illustrate use of an optional preamble and various idle states. The third management frame cycle 210 illustrates an example of a frame cycle in accordance with the present embodiments that include management frames without the optional preamble and synchronizes using data in the data/frame field, and which can be referred to a SYNC frame, as noted above.

As shown by the first two management frame cycles 212, 214, synchronization is performed by various devices using a preamble. The first bit of the command is zero and the sixteenth bit is also always zero. In accordance with specific communications protocols, there can be a maximum of sixteen consecutive ones inside a commands. If more than sixteen ones are detected, this indicates detection of a preamble or start of an idle state.

In various embodiments, the slave logic nodes indicate there is not a need for preambles to the master logic node. Without use of preambles, the management communications bus goes high at the end of every communications transaction, and the first zero after a previous communications transaction is interpreted by a slave logic node as a start of the next transaction (e.g., presumed to be ST). If the slave logic node is reset or otherwise unsynchronized, upon waking up or otherwise listening to the management communications bus, a first zero may be observed at any time, such as in the middle of a communications transaction and which may result in corruption of the slave register content, incorrect register values provided to the master logic node, and/or cause bus contingency.

Generation of and synchronization on the subset of the predefined patterned bits of data, e.g., the sixteen consecutive ones, occurs in accordance with various embodiments without use of the optional preamble, as illustrated by the third management frame cycle 210. The master logic node suppresses the preamble and transmits a SYNC frame to synchronize. A SYNC frame is a write transaction with a data/address field having the subset of the predetermined patterned data bits, such as sixteen consecutive ones. The slave logic nodes may flag events that the master logic node is otherwise unaware of and that may cause the synchronization. This flagging may occur using a different interface, such as via an interrupt mechanisms. The master logic node may further transmit the SYNC frame when the slave logic node does not respond or when the master logic node is aware that synchronization is needed. The SYNC frame, in various embodiments, does not have to change functional register values, and may be to a non-existing PHY address, a read-only register address, a non-existing port address, a non-existing MMD, to a reserved or unused register address and/or a register address that is allocated for synchronization purposes.

As the preamble contains more than sixteen consecutive ones, a slave logic node looking for sixteen consecutive ones for synchronization, also synchronizes on a preamble, thereby ensuring backward compatibility to apparatuses that use a preamble for synchronization. After detection of the sixteen consecutive ones, the bus stays high until the next start-of-frame (ST).

If a slave logic node starts observing the management communications bus (e.g., MDIO bus) after reset, wake-up, or power-up, and ignores bus contents until the subset of the predefined patterned bits of data, e.g., the sixteen consecutive ones, are detected, the slave logic node may reliably synchronize to the management frame, thereby preventing or mitigating misinterpretation of a communications transaction. The slave logic node may miss one or more communications transactions addresses to it before sixteen consecutive ones occur on the management communications bus. If preamble is suppressed by the master logic node and the bus is nearly one-hundred percent loaded, the slave logic node may not synchronize and ignores all traffic. If the management communications bus is lightly loaded and the MDC clock is not stopped, a sequence of sixteen consecutive ones is likely to be detected as soon as the default bus state between frames is high. Low bus load may not be guaranteed which makes it desirable that the master logic node provides a sequence of sixteen consecutive ones on the management communications bus when slave synchronization is needed.

As described above, the master logic node can initiate a SYNC frame when synchronization of a slave logic node is needed. The SYNC frame, in specific embodiments, may have no functional impact on the device other than MDIO frame synchronization. This can be accomplished by choosing other fields of the SYNC frame such that it does not change contents of a register. An example option is selecting an unused Port or PHY Address for a SYNC frame, which may be used for both Clause 22 and Clause 45 transaction types if there is an unused Port or PHY Address available on the management communications bus. If all PHY addresses are used, a Clause 22 SYNC frame to a read-only address may be used. Alternatively, when transmitting a SYNC frame with a Clause 45 transaction, an unused DEVAD or MMD for a selected Port Address may be used. Note that DEVAD=MMD=0 is reserved by construction for any Port Address and may be used for SYNC frames.

The sixteen ones in the data/address field of a management frame is followed by an idle cycle for the duration of one clock cycle which can also appear as 'high' on the bus, given the preceding bit values. Given the start-of-frame formats of Clause 45 transactions, there are typically at least a single preamble bit (bus value 1) before the ST field to ensure an unambiguous one-zero transition at the start of the ST field, as only Clause 22 transactions have a zero-one transition in the ST field. If the MDC clock continues between transactions, there may be seventeen or even eighteen consecutive ones detected by slave logic node. As the signal on the management bus is only weakly defined during the idle state, the clock may stop between frames, and sixteen consecutive ones is sufficient to synchronize. However, detecting and synchronizing on other patterns, such as seventeen or eighteen consecutive ones and/or using other patterns, may be used.

Synchronization using a SYNC frame with a data/address field of 0xFFFF uses incidental generation of SYNC frames by the master logic node and does not require the optional preamble. A SYNC frame is also thirty-two bits long but can be selectively used as the frame can be generated when needed.

In various embodiments, the slave logic nodes may indicate a reset, wake-sleep, and power-cycle events to the master logic node by means of an interrupt. Typically, the master logic node then starts to trace the actual interrupt source by polling the slave logic nodes via MDIO, and the master logic node is aware of the slave addresses present on the bus. A slave logic node that is not yet synchronized does not respond to an indirect address transaction. The master logic node can respond to the non-responsive slave logic node(s) with a SYNC frame which results in the synchronization. A master logic node may periodically send a SYNC frame to set the maximum time that a slave logic node may stay unsynchronized and therefore is unreachable. Using SYNC frames for slave synchronization can reduce MDIO bus loading compared to using preamble.

Figure 3:
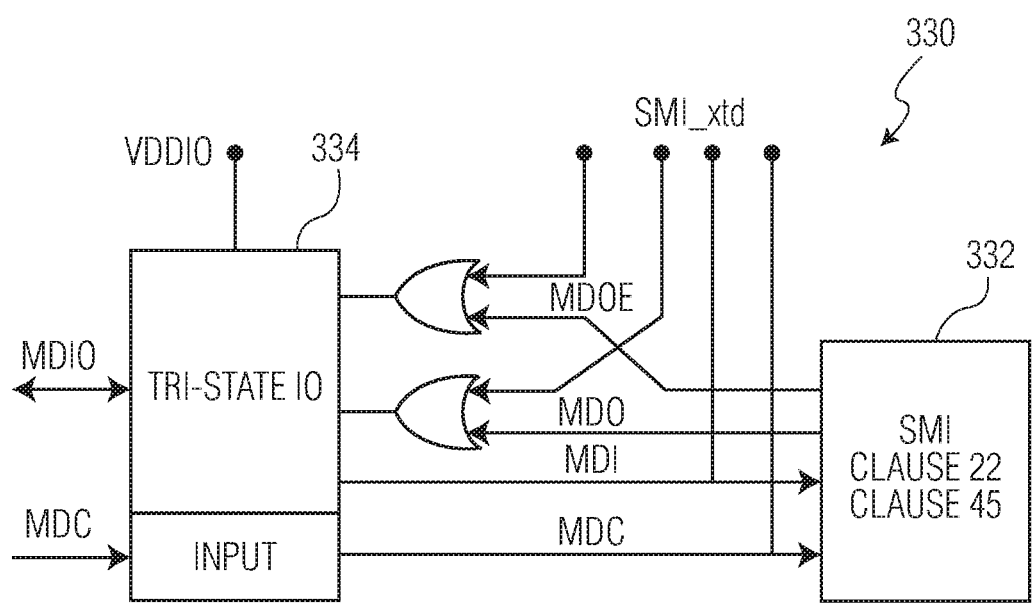
FIG. 3 illustrates an example interface of the communications protocol, in accordance with the present disclosure.

FIG. 3 illustrates an example interface of the communications protocol, in accordance with the present disclosure. More specifically, FIG. 3 illustrates an example SMI 330. As show, the SMI 330 includes the previously described two wire interface including a MDIO and MDC. The MDIO is a shared bus. The SMI 330 further includes a tri-state driver 334 that is present on all devices. The MDIO is passive resistive pull-up and all slave logic nodes listen to and only the addressed port responds. Addressed slave logic nodes drive the MDIO during read responses. The interface is connected to an SMI controller 332 used to control the communications to the different PHYs and/or registers. Typically, there is one SMI interface 330 per device (such as per slave logic node or per network-module device) and not separate SMI interface per PHY or sub-system. There may be multiple SMI functions on a single device and a single SMI interface may address multiple PHY ports. The SMI controller 332 is a function internal to the device comprising a slave logic node, and that translates SMI transactions to internal register transactions. There may be one SMI controller per device, such as per slave logic node or per network-module device, in some specific embodiments.

The above-described apparatus may be used to implement a variety of methods. An example method is use within a local area network characterized by a plurality of network modules configured to convey data over a physical communication channel and with at least one of network modules including a management communications bus for communication among a plurality of logic nodes via a communications protocol. The communications protocol has an optional preamble field with a predetermined set of patterned data bits to synchronize communications between logic nodes among the plurality of logic nodes. The method includes communicating over the management communications bus among the plurality of logic nodes, and at one of the plurality of logic nodes and using circuitry, communicating information in a data/address field of the communications protocol with another of the plurality of logic nodes with reference to a subset of the predetermined set of patterned data bits in the data/address field to synchronize to the transactions. Communicating the information includes providing the subset of the predetermined set of patterned data bits in the data/address field and communicating the information as a communications transaction to the other of the plurality of logic nodes to synchronize in lieu of the (optional) preamble field. In various embodiments the method further includes processing, at the other of the plurality of logic nodes, the communicated information, and in response to the subset of the predetermined set of patterned data bits, synchronizing in lieu of the preamble field. In some embodiments, the one logic node may determine that the other of the plurality of logic nodes is not synchronized and communicate the information to the other logic node in response, such as responsive to a slave logic node not responding to a communications transaction or an interrupt triggered by the slave logic node.

Various embodiments are implemented in accordance with the underlying U.S. patent application (application Ser. No. 16/456,111 entitled "Apparatuses and Methods Involving First Type of Transaction Registers Mapped to Second Type of Transaction Addresses," filed Jun. 28, 2019, which is fully incorporated herein by reference for its general and specific teachings. For instance, embodiments herein and/or in the provisional application may be combined in varying degrees (including wholly). As a specific example, the above-described apparatuses and/or methods may include first type of transaction registers that are mapped to the second type of transaction addresses, such as illustrated by FIGS. 2A-2B and 4. Embodiments discussed in the patent application are not intended, in any way, to be limiting to the overall technical disclosure, or to any part of the claimed disclosure unless specifically noted.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules (e.g., network module), device, system, unit, controller and/or other circuit-type depictions (e.g., reference numerals 100, 101, 106, and 412 of FIGS. 1 and 4A-4B depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown herein. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the apparatus illustrated by FIG. 1 may be used to implement the methods described herein. Such modifications do not depart from the true spirit and scope of various aspects of the disclosure, including aspects set forth in the claims.

What is claimed is:

1. An apparatus for a local area network characterized by a plurality of network modules configured to convey data over a physical communication channel and with at least one of the network modules including a management communications bus for communication among a plurality of logic nodes via a communications protocol and the communications protocol having an optional preamble field with a predetermined set of data bit values to synchronize communications between logic nodes among the plurality of logic nodes, the apparatus comprising:
   a master logic node of the plurality of logic nodes, wherein the master logic node is configured to:
      disable use of the optional preamble field for data communications on the management communications bus,
      receive an indication that a slave logic node of the plurality of logic nodes is not synchronized, and responsive to disabling the use of the optional preamble field and receiving the indication that the slave logic node is not synchronized, communicate, using the management communications bus, a communication transaction that includes a data/address field formatted in accordance with the communications protocol, wherein the master logic node is configured to encode a subset of the predetermined set of data bit values in the data/address field of the communication transaction, the subset of the predetermined set of data bit values includes an invalid address for the communication transaction or invalid data for the communication transaction so that the communication transaction is ignored by synchronized logic nodes of the plurality of logic nodes, and the communication transaction includes a write transaction with the data/address field having the subset of the predetermined set of data bit values that synchronizes the slave logic node to the master logic node; and the slave logic node being configured to:
receive the communication transaction,
determine that the subset of the predetermined set of data bit values is encoded into the communication transaction, and
synchronize to the transactions.

2. The apparatus of claim 1, wherein the subset of the predetermined set of data bit values in the data/address field is a uniquely recognizable subset of the predetermined set of data bit values.

3. The apparatus of claim 1, wherein the optional preamble field is in accordance with the communications protocol.

4. The apparatus of claim 1, wherein the communications protocol is compliant with an industry standard that defines an Ethernet-based local-area network (LAN) technology.

5. The apparatus of claim 1, wherein the communication transaction includes the write transaction to a physical address that is not in use.

6. The apparatus of claim 1, wherein the communication transaction includes the write transaction to a read-only register address.

7. The apparatus of claim 1, wherein the communication transaction includes the write transaction to a port address that is not in use.

8. The apparatus of claim 1, wherein the communication transaction includes the write transaction to a management data input/output-managed device (MMD) number that does not exist for an indicated port address.

9. The apparatus of claim 1, wherein the communication transaction includes the write transaction to a management data input/output-managed device (MMD) number associated with an address pointer to an unused register address.

10. The apparatus of claim 1, wherein the communication transaction includes the write transaction to a management data input/output-managed device (MMD) number associated with a register address that is reserved.

11. The apparatus of claim 1, wherein the subset of the predetermined set of data bit values in the data/address field include a uniquely recognizable consecutive set of values which is provided as part of load data, and the slave logic node that receives the communication transaction from the master logic node, and in response, synchronizes to the transactions.

12. A method for use within a local area network characterized by a plurality of network modules configured to convey data over a physical communication channel and with at least one of the network modules including a management communications bus for communication among a plurality of logic nodes via a communications protocol and the communications protocol having an optional preamble field with a predetermined set of data bit values to synchronize communications between logic nodes among the plurality of logic nodes, the method comprising:

at one of the plurality of logic nodes and using circuitry:
disabling use of the optional preamble field for data communications on the management communications bus,
receive an indication that a slave logic node of the plurality of logic nodes is not synchronized, and
after disabling the use of the optional preamble field and responsive to receiving the indication that the slave logic node is not synchronized, communicating a synchronization data frame including information in a data/address field of the communications protocol that includes a subset of the predetermined set of data bit values in the data/address field to synchronize the other of the plurality of logic nodes to the one of the plurality of logic nodes and transactions carried out on the management communications bus, wherein the subset of the predetermined set of data bit values includes an invalid address for the communication transaction or invalid data for the communication transaction so that the communication transaction is ignored by synchronized logic nodes of the plurality of logic nodes, and the synchronization data frame includes a write transaction with the data/address field having the subset of the predetermined set of data bit values that synchronizes the slave logic node to a master logic node, wherein the slave logic node is configured to receive the synchronization data frame, determine that the subset of the predetermined set of data bit values is encoded into the synchronization data frame, and synchronize to the transactions.

13. The method of claim 12, wherein communicating the information includes providing the subset of the predetermined set of data bit values in the data/address field and communicating the information as a communications transaction to the other of the plurality of logic nodes to synchronize in lieu of the preamble field.

14. The method of claim 12, further including processing, at the other of the plurality of logic nodes, the communicated information, and in response to the subset of the predetermined set of data bit values, synchronizing in lieu of the preamble field.

15. The method of claim 12, wherein the indication that the slave logic node is not synchronized includes a determination that the slave logic node is unresponsive to a previously provided communications transaction.

* * * * *